United States Patent
Tucker et al.

(10) Patent No.: US 6,625,014 B1
(45) Date of Patent: Sep. 23, 2003

(54) SYSTEM AND METHOD FOR SITUATING A DISK DRIVE

(75) Inventors: Sean W. Tucker, Loveland, CO (US); Kristina Lynn Mann, Fort Collins, CO (US); Arlen L. Roesner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/141,461

(22) Filed: May 7, 2002

(51) Int. Cl.[7] ................................................ G06F 1/16
(52) U.S. Cl. .................. 361/685; 361/724; 360/97.01; 369/275.1; 312/223.1
(58) Field of Search .............................. 361/679–687, 361/724–727; 360/97.01; 369/100–109, 275.1; 312/223.1–223.6

(56) References Cited

U.S. PATENT DOCUMENTS

| | | |
|---|---|---|
| 4,682,833 A | 7/1987 | Ferchau et al. |
| 5,077,722 A | 12/1991 | Geist et al. |
| 5,340,340 A | 8/1994 | Hastings et al. |
| 5,654,873 A | 8/1997 | Smithson et al. |
| 5,765,933 A | 6/1998 | Paul et al. |
| 5,791,753 A | 8/1998 | Paquin |
| 6,067,225 A | 5/2000 | Reznikov et al. |
| 6,227,631 B1 | 5/2001 | Lin et al. |
| 6,460,948 B2 * | 10/2002 | Roesner et al. .......... 312/223.1 |
| 6,525,933 B2 * | 2/2003 | Eland ......................... 361/686 |

OTHER PUBLICATIONS

U.S. patent application Ser. No. 09/430,333, Roesner et al.
U.S. patent application Ser. No. 10/141,487, Tuttle et al.
U.S. patent application Ser. No. 10/080,189, Dean et al.
U.S. patent application Ser. No. 10/080,341, Dean et al.

* cited by examiner

Primary Examiner—Darren Schuberg
Assistant Examiner—Hung Van Duong

(57) ABSTRACT

A system and method for situating a disk drive is provided. One embodiment comprises a system for situating a disk drive within a chassis. The system comprises a disk drive unit comprising a drive bracket coupled to the disk drive, as well as a lever member movably coupled to the drive bracket. The system further comprises a drive guide coupled to the chassis. There earlier-mentioned lever member is operable to engage the drive guide when the disk drive unit is being situated within the chassis. Furthermore, the system enables the situating of the disk drive unit within the chassis along a plane other than a plane along which a connector of the disk drive mates with a connector disposed within the chassis.

33 Claims, 6 Drawing Sheets

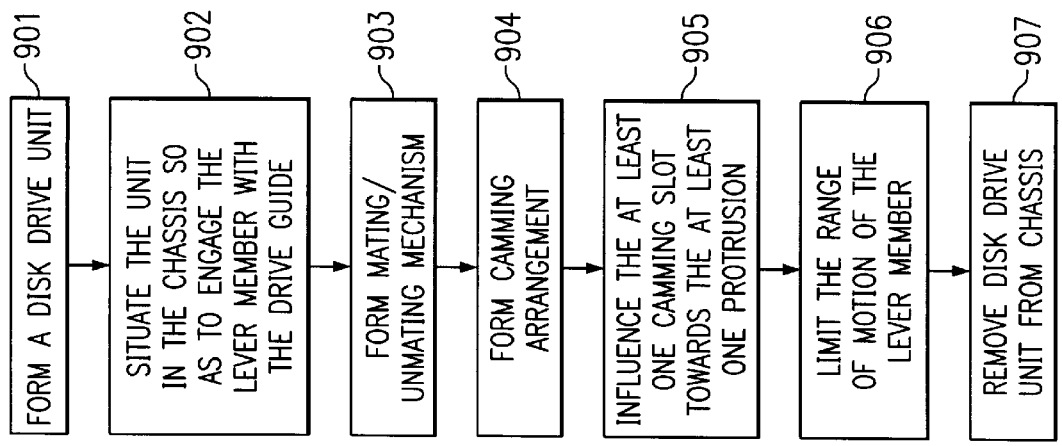
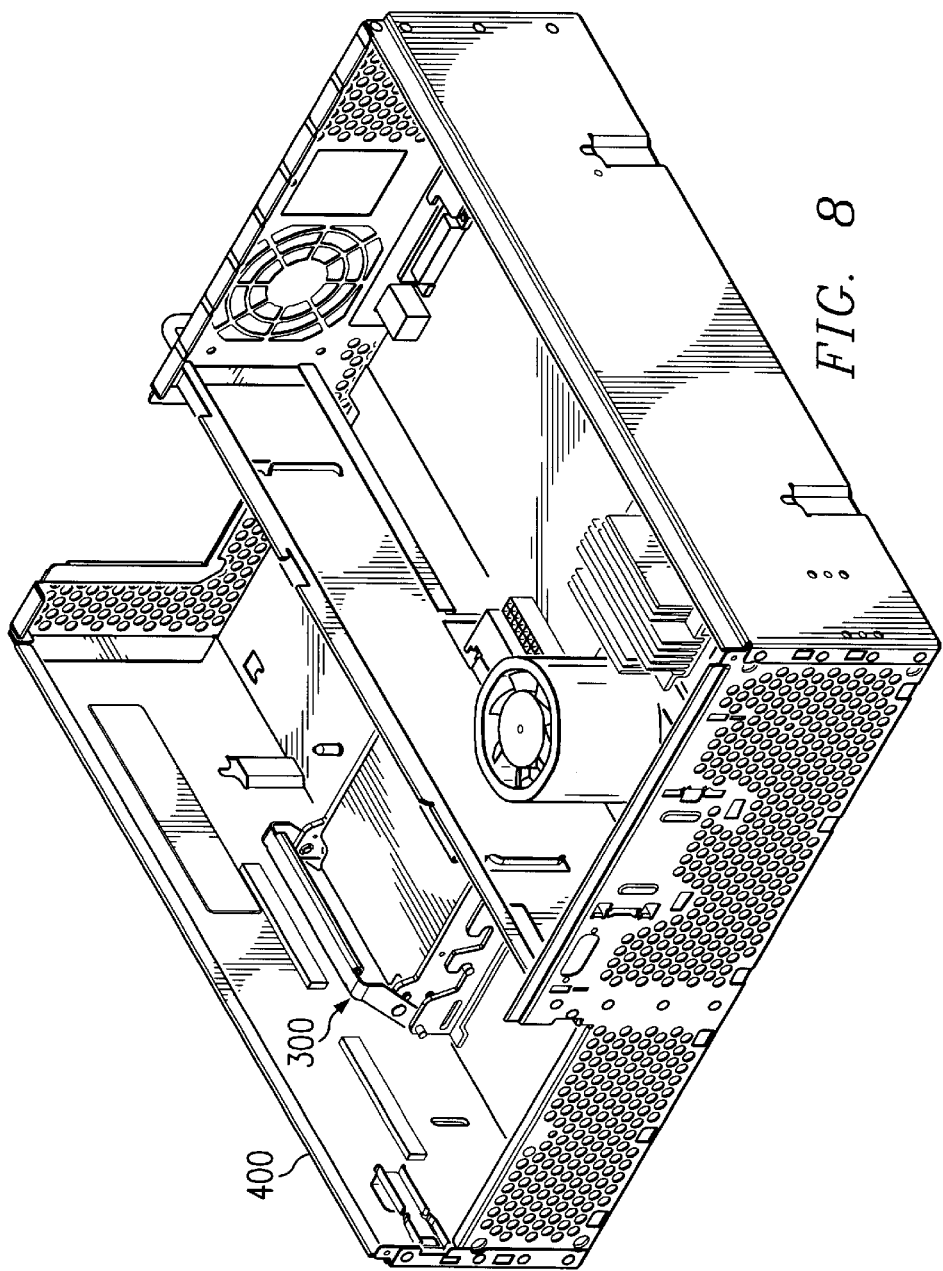

SYSTEM AND METHOD FOR SITUATING A DISK DRIVE

CROSS-REFERENCE TO RELATED APPLICATIONS

This application is related to and commonly-assigned U.S. patent application Ser. No. 10/080,189 entitled "SYSTEM AND MEANS FOR THE SECURE MOUNTING OF A DEVICE BRACKET", filed Feb. 21, 2002; and commonly-assigned U.S. patent application Ser. No. 10/080, 341 entitled DEFORMABLE MOUNTING BRACKET", filed Feb. 21, 2002; and and commonly-assigned U.S. patent application Ser. No. 10/141,487 entitled "SYSTEM AND METHOD FOR STABILIZING A MATING"; the disclosures of which are hereby incorporated herein by reference.

FIELD OF THE INVENTION

The present invention relates to disk drives, and in one aspect to a system and method for situating a disk drive.

BACKGROUND OF THE INVENTION

Disk drives are highly developed for storing substantial amounts of data. On average, a disk drive is either integrally associated with a computer assembly or is removable therefrom. Often, a disk drive is removable because it is integrated with a drive bracket adapted for such purposes. The integrated disk drive and bracket form a removable disk drive unit.

Removable disk drive units are normally adapted for being situated within and removed from a chassis of a computer assembly. Typically, upon being situated within a chassis, a connector of the disk drive included in the unit is then mated with one of the connectors disposed within the chassis, thereby enabling the transfer of data to and from the disk drive, the coupling of the disk drive to a power supply, and/or the like.

Existing removable disk drive units are situated within, as well as removed from, a chassis along the same plane as that of the above-mentioned mating between a connector of the disk drive and a matching connector disposed within the chassis. Situating a disk drive unit within a chassis and removing disk drive unit therefrom in such a manner limits the flexibility a designer has in using and arranging components within the chassis. For example, valuable chassis space must remain vacant so as to provide a pathway into and/or through the device in order to enable the removable disk drive unit to reach a matching connector disposed within the chassis.

In addition to the above, often mating a disk drive connector with a connector disposed within a chassis involves attempting a blind mate connection. For purposes of this disclosure only, a blind mate connection is one in which a user attempts to mate the disk drive connector with a matching connector without the benefit of being able to view the mating parts to ensure they are aligned and properly engaged. As a corollary, the user is typically unable to visually observe any adjustments.

Other characteristics of at least some existing removable disk drive units is the non-uniformity in the application of force across the earlier-mentioned disk drive connector when the disk drive connector is being mated with a matching connector disposed within the chassis. For example, in some existing removable disk drive units, force applied by a user to the removable disk drive unit for purposes of mating the connectors is concentrated across substantially less than the width of the drive connector. As a result, the disk drive connector may not fully or evenly mate with the matching connector disposed within the chassis. If the connectors are not fully engaged, erroneous operation or intermittent failure may occur with the disk drive unit.

In addition, existing removable disk drive units do not provide a positive stop or other means for limiting the movement of such removable disk drive units in the direction of mating between the disk drive connector and the matching connector discussed above. Any positive stop provided by a removable disk drive unit is usually due to the mating of the disk drive connector with the matching connector disposed within the chassis. A removable disk drive unit that uses the matching connector as a positive stop places unwanted force upon the connector that may result in connector failure.

Furthermore, existing removable disk drive units often have sharp edges or other characteristics that make them difficult or awkward to carry.

SUMMARY OF THE INVENTION

The present invention is directed to a system and method for situating a disk drive. One embodiment comprises a system for situating a disk drive within a chassis. The system comprises a disk drive unit comprising a drive bracket coupled to the disk drive, as well as a lever member movably coupled to the drive bracket. The system further comprises a drive guide coupled to the chassis. There earlier-mentioned lever member is operable to engage the drive guide when the disk drive unit is being situated within the chassis. Furthermore, the system enables the situating of the disk drive unit within the chassis along a plane other than a plane along which a connector of the disk drive mates with a connector disposed within the chassis.

BRIEF DESCRIPTION OF THE DRAWINGS

FIG. 8 provides an elevation view of an exemplary disk drive unit after being mated with a connector disposed within an exemplary chassis according to an embodiment of the present invention; and FIG. 9 depicts an exemplary method for situating an exemplary disk drive within an exemplary chassis according to an embodiment of the present invention.

DETAILED DESCRIPTION OF THE INVENTION

Figure 1:
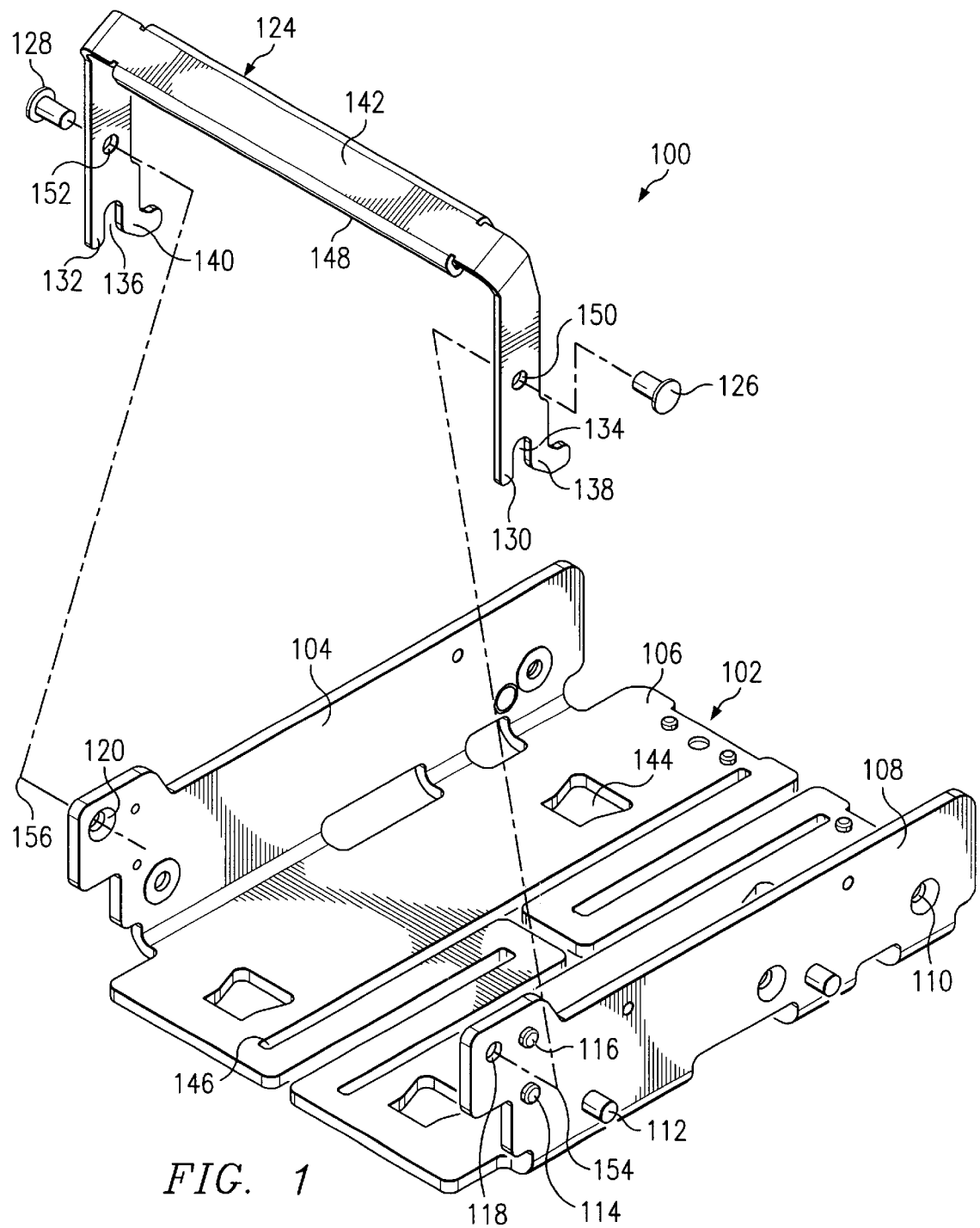
FIG. 1 depicts an exploded isometric view of an arrangement of an exemplary drive bracket and an exemplary lever member according to an embodiment of the present invention.

FIG. 1 depicts an exploded isometric view of an exemplary arrangement 100 of an exemplary drive bracket 102 and an exemplary lever member 124. In one embodiment, drive bracket 102 is shaped to receive one or more disk drives (e.g., hard drives). In some embodiments, drive bracket 102 is generally U-shaped. In the illustrated embodiment, drive bracket 100 comprises floor 106 with side panels 104 and 108 extending upwardly from opposing sides of floor 106. Side panels 104 and 108 may be attached to floor 106 or formed as part of an integral unit therewith.

One or more apertures may be formed by drive bracket 102. For example, drive bracket 102 may comprise drive coupling apertures, such as drive coupling aperture 110, for receiving one or more means for coupling a disk drive (e.g., a hard disk drive) to drive bracket 102. Non-limiting examples of such means include rivets, screws, bolts, pegs, etc., now known or later developed. In some embodiments, these drive coupling apertures may have countersinks inserted therein to accommodate the coupling means. Generally, the exact positioning of the drive coupling apertures is pre-determined or dictated by the positioning of mounting holes in the disk drive.

Likewise, drive bracket 102 may form one or more lever member apertures, such as lever member apertures 118 and 120, for receiving one or more means for coupling lever member 124 to drive bracket 102. Similar to the above, non-limiting examples of such means include rivets, screws, bolts, pegs, and/or the like, now known or later developed. The lever member apertures may have grommets, bushings, countersinks and/or the like inserted therein for receiving the above-mentioned coupling means.

In addition, drive bracket 102 may form one or more drive bracket slots (e.g., drive bracket slot 144). In one embodiment, drive bracket 102 comprises four drive bracket slots dispersed in different locations in drive bracket 102. However, one of ordinary skill in the art would appreciate that a different number, arrangement, and/or orientation of mounting bracket slots may be used. The illustrated drive bracket slots, as well as other embodiments thereof, are described in detail in commonly-assigned U.S. patent application Ser. No. 10/080,189, the disclosure of which was previously incorporated herein by reference.

In addition to or in the alternative of the above-mentioned apertures, drive bracket 102 may include one or more protrusions. For example, in one embodiment, side panels 104 and 108 comprise one or more drive guide appendages (e.g., appendage 112) for insertion within slots formed by a drive guide (discussed in detail below). In one embodiment, drive bracket 102 comprises four such appendages. However, a different number of mounting appendages may be used. In some embodiments, the drive guide appendages of drive bracket 102 are used to hold arrangement 100 in a specific vertical alignment when arrangement 100 is situated within a chassis.

Similarly, side panels 104 and 108 may comprise one or more lever member stops (e.g., stops 114 and 116) for limiting the range of motion of lever member 124 when movably coupled to drive bracket 102. These protrusions may be formed as integral parts of drive bracket 102 (e.g., through press operations, embossing, etc.). However, in some embodiments, such protrusions are attached to drive bracket 102 (e.g., inserted into or through apertures of bracket 102 and/or welded to drive bracket 102).

In the illustrated embodiment, in addition to the above, drive bracket 102 comprises compression elements 146. In one embodiment, compression elements 146 ensure the easy installation and snug capture of a device by drive bracket 102. The illustrated compression elements, as well as other embodiments thereof, are described in detail in commonly assigned U.S. patent application Ser. No. 10/080,341, the disclosure of which was previously incorporated herein by reference.

Drive bracket 102 may be made from conductive material. In one embodiment, drive bracket 102 is made of an aluminum alloy, thereby improving thermal conductivity. Drive bracket 102 may be formed by stamping and folding a sheet of aluminum alloy. In some embodiments, formation of drive bracket 102 involves a die press.

As mentioned, lever member 124 may be coupled to drive bracket 102. In some embodiments, lever member 124 is shaped for effecting the mating and unmating of a disk drive with a connector disposed within the chassis, as well as for situating the disk drive within and/or removing the disk drive from the chassis. In one embodiment, lever member 124 is generally U-shaped, with a handle 142 having side arms 130 and 132 extending from opposing sides thereof.

Handle 142 may provide for ease of handling or carrying of arrangement 100. In one embodiment, handle 142 has an open hem design 148. Open hem design 148 may be formed by rolling at least a portion of the edges of handle 142. In one embodiment, such is accomplished using a standard sheet metal forming process, such as a die press with appropriate tooling. In an alternative embodiment, such ease of handling is provided through caps, slips or other parts attached to handle 142 to compensate for any uncomfortable edging or other like features of some embodiments of handle 142. In some embodiments, open hem design 148 protects a user from injury due to burrs and sharp edges that are caused by a stamping operation used to create handle 142.

In the illustrated embodiment, lever member 124 forms at least one camming slot (e.g., camming slots 134 and 136). In one embodiment, such camming slots are formed by one or more side arms of lever member 124 (e.g., side arms 130 and 132). However, in an alternative embodiment, one or more of the camming slots are formed within a plate structure that may be, e.g., bolted or welded, to the side arms.

Furthermore, lever member 124 may comprise at least one surface (e.g., surfaces 138 and 140) shaped so as to influence alignment of the camming slots of lever member 124 with one or more protrusions of the earlier-mentioned drive guide coupled to a chassis (discussed in greater detail below). In one embodiment, such surfaces comport with the geometry of the protrusions of the drive guide. In the illustrated embodiment, surfaces 138 and 140 are tapered towards camming slots 134 and 136 respectively.

Lever member 124 may be movably coupled to drive bracket 102. In one embodiment, such movable coupling is provided by passing coupling means (e.g., coupling means 126 and 128) through apertures in lever member 124 (e.g., apertures 150 and 152) and into apertures of drive bracket 102 (e.g., lever member apertures 118 and 120). In some embodiments, those portions of the coupling means entering the apertures of drive bracket 102 engage threads and/or the like located on the surfaces of drive bracket 102 forming the apertures. As mentioned, the above-mentioned coupling means (e.g., coupling means 126 and 128) may include, but are not limited to, rivets, bolts, pegs and/or the like made from metal, plastic, and/or other materials. In one embodiment, such a movable coupling does not include bushings, grommets, etc. However, embodiments of the present invention are not limited in such a manner. In some embodiments, the above-mentioned movable coupling is a rotatable coupling, whereby lever member 124 may be rotated about points of rotation 154 and 156.

As mentioned, the lever member stops of drive bracket 102 may limit the range of movement of lever member 124. For example, in the illustrated embodiment, lever member stop 116 limits movement of lever member 124 in the clockwise direction (see FIG. 2) and lever member 114 limits movement of lever member 124 in the counter-clockwise direction.

Figure 3:
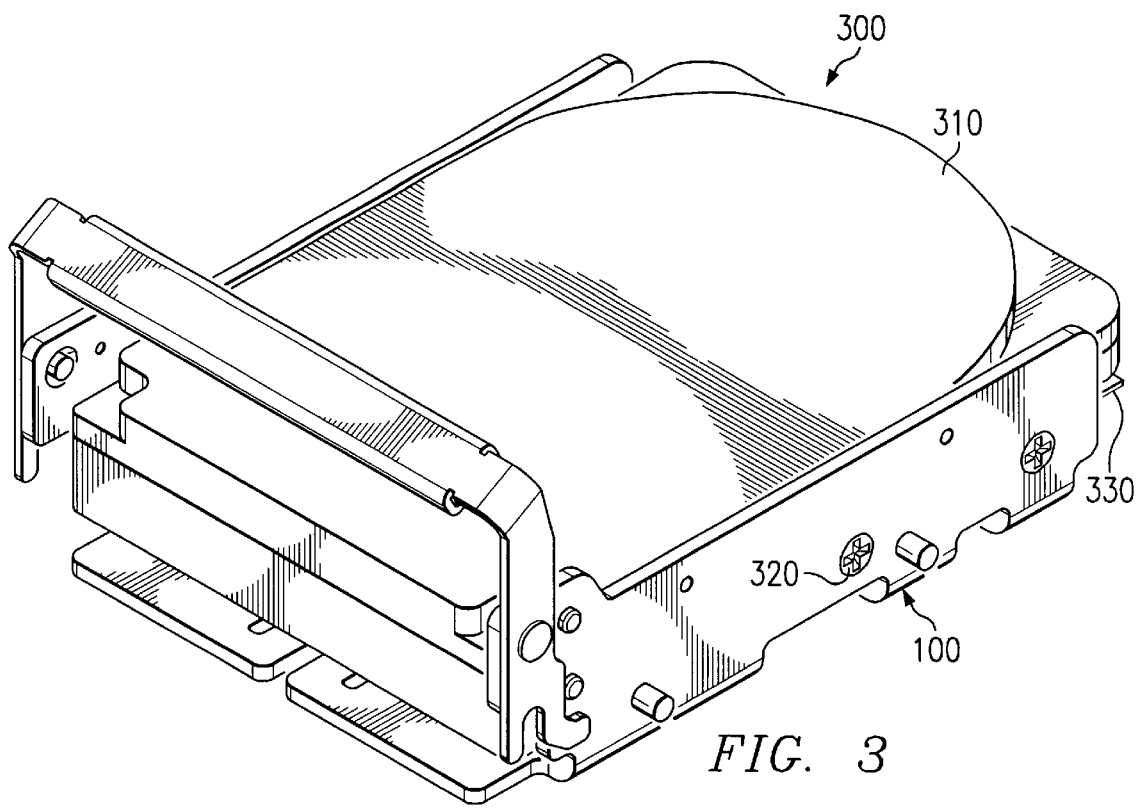
FIG. 3 depicts an exemplary disk drive unit according to an embodiment of the present invention.

One or more disk drives or other storage media may be integrated with arrangement 100 to form a removable disk drive unit. As a non-limiting example of such, FIG. 3 depicts exemplary removable disk drive unit 300. In the illustrated embodiment, removable disk drive unit 300 comprises disk drive 310 coupled to arrangement 100. Similar to earlier discussions, disk drive 310 may be coupled to arrangement 100 by passing at least a portion of one or more coupling means (e.g., coupling means 320) through the above discussed coupling apertures of device bracket 102 and engaging threads and/or the like of disk drive 310. However, disk drive 310 may be coupled to arrangement 100 in other ways.

Disk drive 310 may be any suitable means for storing data (e.g., a hard drive, an optical drive, a tape drive, a floppy drive, etc.). In one embodiment, disk drive 310 comprises a connector (e.g., connector 330) for mating with a compatible connector so as to enable the transfer data and/or power to and from disk drive 310, and/or to otherwise make disk drive 310 operational. In one embodiment, connector 330 comprises a plurality of electrically conductive surface traces (not shown), such as grounding traces and signal traces. Connector 330 may comprise at least some components for mating with at least a portion of a connector disposed within a chassis (discussed in greater detail below). As a non-limiting example of such, connector 330 may include pins that are mateable with sockets of a connector disposed within a chassis or vice versa.

Figure 2:
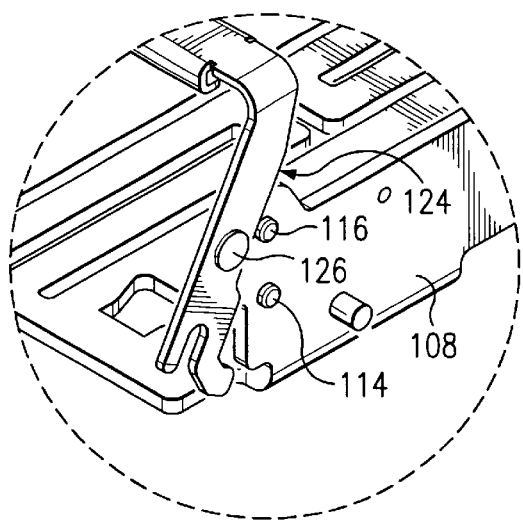
FIG. 2 provides a close-up view of a region of the exemplary drive bracket depicted in FIG. 1.

It will be appreciated by one of ordinary skill in the art that arrangement 100, as well as removable disk drive unit 300, depicted in FIGS. 1, 2, and 3 respectively, are by way of example only. Both arrangement 100 and removable disk drive unit 300 may contain fewer, more, and/or different components than those depicted in FIGS. 1, 2, and 3. For example, disk drive unit 300 may further comprise elements of removable disk drive units disclosed in U.S. patent application Ser. No. 09/430,333, entitled "EMI-Efficient Drive Mounting System", filed Oct. 29, 1999; U.S. Pat. No. 4,682,8333, entitled "Alignment and Connection Mechanism", issued to Ferchau et al.; U.S. Pat. No. 5,077,722, entitled "Disk Drive Insertion and Removal Interlock", issued to Geist et al.; U.S. Pat. No. 5,340,340, entitled "Apparatus For Removably Supporting A Plurality of Hot Plug-Connected Hard Disk Drives", issued to Hastings et al.; U.S. Pat. No. 5,765,933, entitled "CAM Assisted Ejection Handle For A Removable Drive Carrier", issued to Paul et al.; U.S. Pat. No. 6,067,225, entitled "Disk Drive Bracket", issued to Reznikov et al.; U.S. Pat. No. 6,227,631 B1, entitled "Computer Enclosure", issued to Lin et al., U.S. Pat. No. 5,654,873, entitled "Single Connector Attachment Drive Sled Assembly Having Light Pipe Coupled to a Rail", issued to Smithson et al.; and U.S. Pat. No., 5,791,753, entitled, "Computer Component Handle Assembly", issued to Paquin; the disclosures of which are hereby incorporated by reference herein. In addition, such components may be arranged in a manner other than that depicted in FIGS. 1, 2, and 3. As a non-limiting example, connector 330 may include a plurality of individual connectors.

Figure 4:
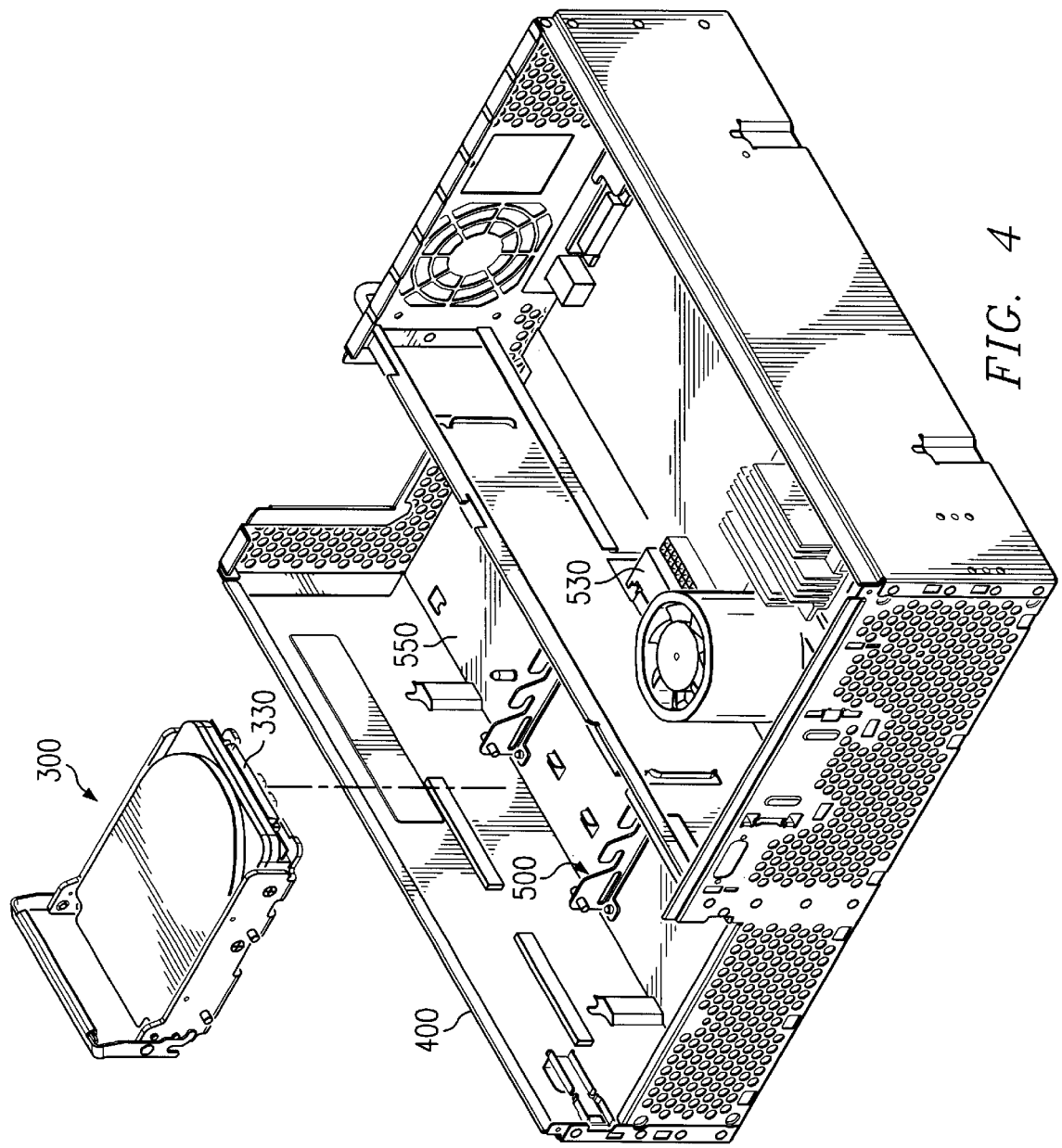
FIG. 4 depicts an exemplary disk drive unit being disposed within an exemplary chassis according to an embodiment of the present invention.

Similar to earlier discussions, in some embodiments, removable disk drive unit 300 is situated within a chassis, whereby connector 330 may then be mated with a compatible connector disposed within the chassis. FIG. 4 provides an exemplary illustration of the situating of removable disk drive unit 300 within an exemplary chassis. Chassis 400 may be a chassis of any computer device now known or later developed. A computer devices for purposes of this disclosure only is a device that includes at least one processor (e.g., a central processing unit). Non-limiting examples of such computer devices include storage devices and server devices. Accordingly, chassis 400 may have components associated with such devices disposed therein. In one embodiment, a plurality of removable disk drive units may be situated within chassis 400, the size and spacing thereof being subject to considerable variation (embodiments of such are described in detail in commonly-assigned U.S. patent application Ser. No. 10/080,189, the disclosure of which was previously incorporated herein).

In the illustrated embodiment, removable disk drive unit 300 is being situated within chassis 400 so as to engage a drive guide 500 coupled to the chassis. In one embodiment, drive guide 500 is a mating piece with removable disk drive unit 300 that provides guidance and alignment (vertical and/or horizontal) to removable disk drive unit 300 as it is mated with a connector disposed within chassis 400. Moreover, in some embodiments, the engagement of drive guide 500 and disk drive unit 300 forms a mating/unmating mechanism (described in detail below) whereby disk drive unit 300 may be moved between one position and at least another position, thereby effecting the mating and unmating of disk drive unit 300 with a connector disposed within chassis 400.

Figure 5:
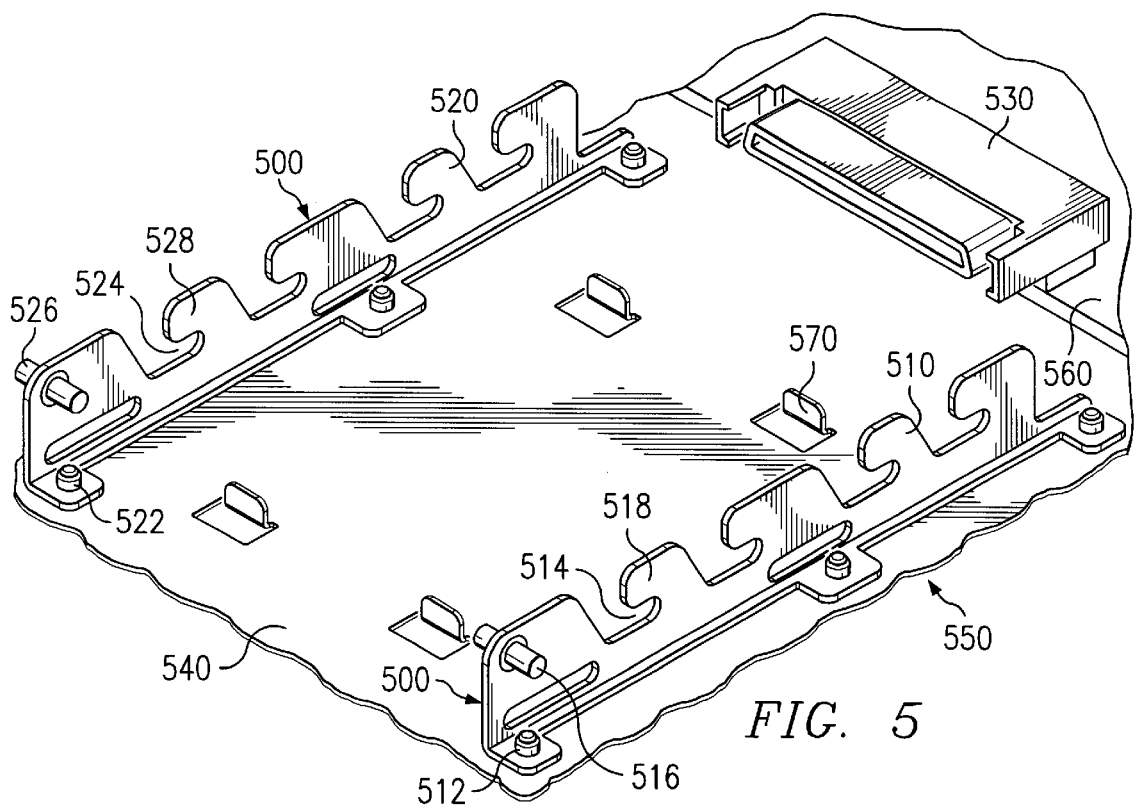
FIG. 5 depicts an exemplary region of the chassis depicted in FIG. 4.

FIG. 5 provides a close-up image of exemplary area 550 within chassis 400 wherein drive guide 500 may be situated. In the illustrated embodiment, area 550 comprises chassis base 540, exemplary connector 530, circuit board 560, and drive guide 500.

Chassis base 540 may comprise a panel comprising one or more tabs (e.g., tab 570) and/or other similar features for engaging the earlier mentioned drive bracket slots (e.g., drive bracket slot 144) of drive bracket 102. In one embodiment, chassis basis 540 comprises four such tabs or other similar features dispersed in different locations in chassis basis 540 corresponding to the location of the drive bracket slots of drive bracket 102. However, one of ordinary skill in the art would appreciate that a different number, arrangement, and/or orientation of tabs and/or other similar features may be used. The illustrated embodiment of chassis base 540, as well as other embodiments of base 540, are described in detail in commonly-assigned U.S. patent application Ser. No. 10/080,189, the disclosure of which was previously incorporated herein by reference.

In one embodiment, drive guide 500 comprises one or more rails (e.g., rails 510 and 520) coupled to chassis floor 540. These rails may be arranged parallel to each other or in a different orientation. Each rail may be composed of a sheet metal piece folded such that the metal to one side of the fold is perpendicular or nearly perpendicular to the plane of the piece located on the other side of the fold. The rails of drive guide 500 may be composed of material other than sheet metal. In the illustrated embodiment, each rail is nearly identical, which reduces the cost of manufacturing. In other embodiments, the rails of drive guide 500 are not nearly identical.

Drive guide 500 may further comprise one or more protrusions (e.g., protrusion 516 and 526). In one embodiment, these protrusions are mounted to or formed in the rails of drive guide 500 and extend parallel to the plane of chassis base 540 when drive guide 500 is coupled thereto. In some embodiments, each protrusion extends through a rail of drive guide 500, such that an approximately equal length of protrusion extends to either side of the rail. However, in alternative embodiments, such protrusions may extend to only one side of a rail.

In one embodiment, one or more rails of drive guide 500 form at least one slot, such as slots 514 and 524. In one embodiment, such slots are formed in a rail by cutting portions of the piece of sheet metal making up the rail on only one side of the earlier mentioned fold. In the illustrated embodiment, the slots of rails 510 and 520 are horizontal and parallel to chassis base 540 with a roughly vertical opening perpendicular to chassis base 540. In one embodiment, such slots allow for the insertion therein of the earlier-mentioned drive guide appendages (e.g., appendage 112) of drive bracket 102, as well as the engagement and capture of such appendages. In addition, remaining portions of the rails of drive guide 500 after such slots are formed therein (e.g., portions 518 and 528) may act as stops for prohibiting further movement of disk drive unit 300 towards connector 530 during mating of connector 330 with connector 530. In one embodiment, these stops prohibit further movement of disk drive unit 300 in a direction normal to the portion of chassis 400 to which drive guide 500 is mounted.

Drive guide 500 may be coupled to chassis 400 via numerous means. For example, in one embodiment, drive guide 500 is coupled to chassis base 540 via rivets (e.g., rivets 512 and 522), screws, bolts, and/or the like. However, in one alternative embodiment, drive guide 500 is welded to and/or is formed as part of at least a portion of chassis 400 (e.g., chassis base 540).

Drive guide 500 is described in greater detail in commonly-assigned U.S. patent application Ser. No. 10/080, 189, the disclosure of which was previously incorporated herein by reference Connector 530 may be electrically coupled to a printed circuit board. (e.g., circuit board 560) disposed within chassis 400. In one embodiment, connector 530 comprises a plurality of electrically-conductive surface traces (not shown), such as grounding traces and signal traces. Similar to the above, connector 530 may comprise at least some components for mating with at least a portion of the components of connector 330. As a non-limiting example of such components, in one embodiment, connector 530 comprises sockets that are mateable with pins of an embodiment of connector 330. In one embodiment, circuit board 560 comprises a motherboard.

It will be appreciated that the embodiments of area 550, drive guide 500, chassis base 540 and connector 530 depicted in FIG. 5 are by way of example only. Area 550, drive guide 500, chassis base 540 and connector 530 may include fewer, more, or different elements than those depicted in FIG. 5. Moreover, such elements may be arranged differently than that depicted in FIG. 5. For example, in one embodiment, connector 530 is made up of a plurality of individual connectors.

Figure 6A:
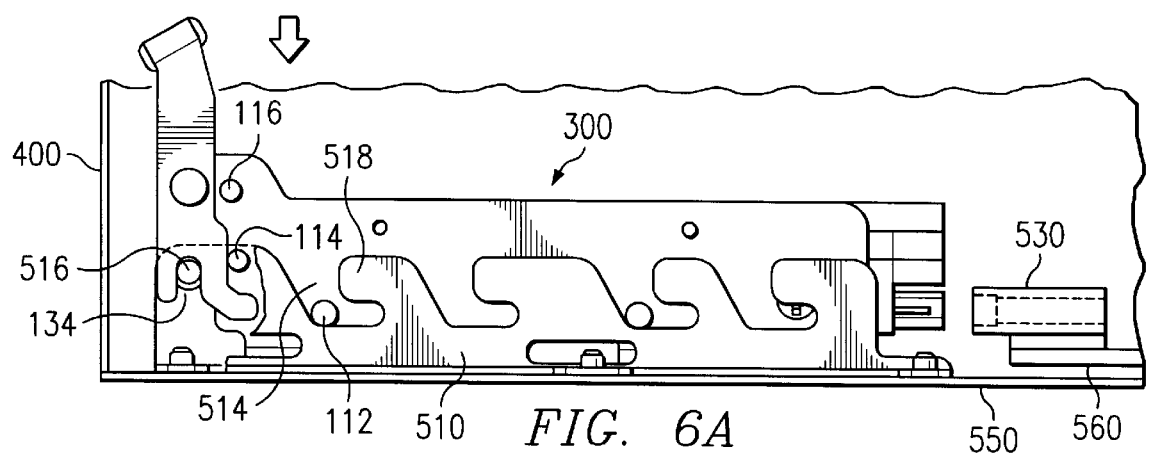
FIG. 6A depicts a cross-sectional view of an exemplary disk drive unit in a first position with respect to the exemplary chassis in which the disk drive unit is disposed.

FIG. 6A depicts a cross-sectional view of removable disk drive unit 300 as it engages drive guide 500 while its being situated within chassis 400. In one embodiment, unit 300 may be situated within chassis 400 along a plane other than a plane along which connector 330 mates with connector 530 (e.g., a plane orthogonal to the plane along which connector 330 mates with connector 530).

In the illustrated embodiment, camming slot 134 engages protrusion 516 by rotating around protrusion 516. Camming slot 136 (not shown) also engages protrusion 526 by rotating around protrusion 526 (not shown).

To help ensure that protrusions 516 and 526 engage camming slots 134 and 136 as removable disk drive unit 300 is being situated within chassis 400, in the illustrated embodiment, stop 114 limits the range of motion of lever member 124 in the counter-clockwise direction so as to prevent lever member 124 from rotating into a position that prohibits camming slot 134 from engaging protrusion 516. Similarly, stop 116 limits the range of motion of lever member 124 in the clockwise direction so as to prevent lever member 124 from rotating into a position that prohibits camming slot 134 from engaging protrusion 516. Drive bracket 105 may include similar stops to prevent lever member 134 from rotating into a position that prohibits camming slot 136 (not shown) from engaging protrusion 518 (not shown). Moreover, lever member 124 may comprise one or more surfaces (e.g., surfaces 138 and 140) operable to influence camming slots 134 and 136 towards suitable alignment for engagement with protrusions 516 and 526 if such camming slots and protrusions are not in already in such a suitable alignment as removable disk drive unit 300 is being situated within chassis 400. Similar to earlier discussions, in one embodiment, such surfaces correspond with the geometry of the protrusion.

Moreover, in the illustrated embodiment, as drive unit 300 engages drive guide 500, at least one of the appendages of unit 300 (e.g., appendage 112) engages at least one of the slotted openings formed by drive guide 500 (e.g., opening 514). As mentioned, in some embodiments, at least one of these slotted openings has a generally vertical portion and a horizontal portion.

In one embodiment, when lever member 124 and drive guide 500 are engaged in the manner illustrated in FIG. 6A, they form a mating/unmating mechanism that is responsive to movement of lever member 124 to one position for effecting a mating between connector 330 and connector 530, and responsive to movement to at least another position for effecting an unmating of disk drive connector 530 and connector 330. Such a mating/unmating mechanism may provide a sufficient uniform force to fully mate (as well as unmate) connector 330 with connector 530. In one embodiment, the mating/unmating mechanism comprises at least one protrusion of drive guide 500 (e.g., protrusions 516 and 526) and at least one camming slot formed by lever member 124 (e.g., camming slots 134 and 136).

In the illustrated embodiment, from its illustrated position, disk drive unit 300 may be disengaged from connector 530, whereby disk drive unit 300 may be removed from chassis 400. In one embodiment, removable disk drive unit 300 may be removed from chassis 400 by moving removable disk drive unit 300 along the plane that unit 300 was situated within chassis 400. As mentioned, this plane may be orthogonal to the plane along which connector 330 is to be mated with connector 530.

Furthermore, in one embodiment, engagement of disk drive unit 300 with drive guide 500 aligns drive unit 300 (particularly, connector 330) with connector 530. In some embodiments, such engagement both horizontally and vertically aligns disk drive unit 300 with connector 530.

Figure 6B:
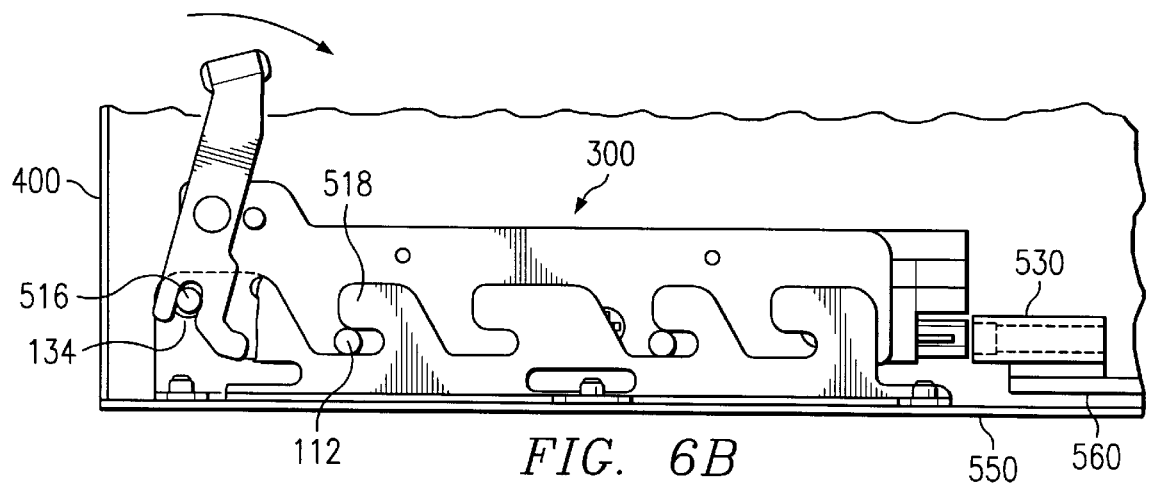
FIG. 6B depicts a cross-sectional view of the exemplary disk drive unit in another position with respect to the exemplary chassis in which the disk drive unit is disposed.

FIG. 6B depicts a cross-sectional view of chassis 400 as removable disk drive unit 300 is an intermediate position moving towards the position for effecting a mating between connector 330 and connector 530. In one embodiment, the movement of lever member 124, along with the corresponding engagement of lever member 124 with protrusion 516 and protrusion 518 (not shown), tends to push removable disk drive unit 300 towards connector 530. Thus, movement of lever member 124 moves unit 300 with respect to chassis 400 (particularly, base 540). In the illustrated embodiment, as lever member 124 is moved in the clockwise direction, the engagement of lever member 124 with protrusions 516 and 518 urges removable disk drive unit 300 to move along rails 510 and 520 (rail 520 not shown) towards connector 530.

Figure 6C:
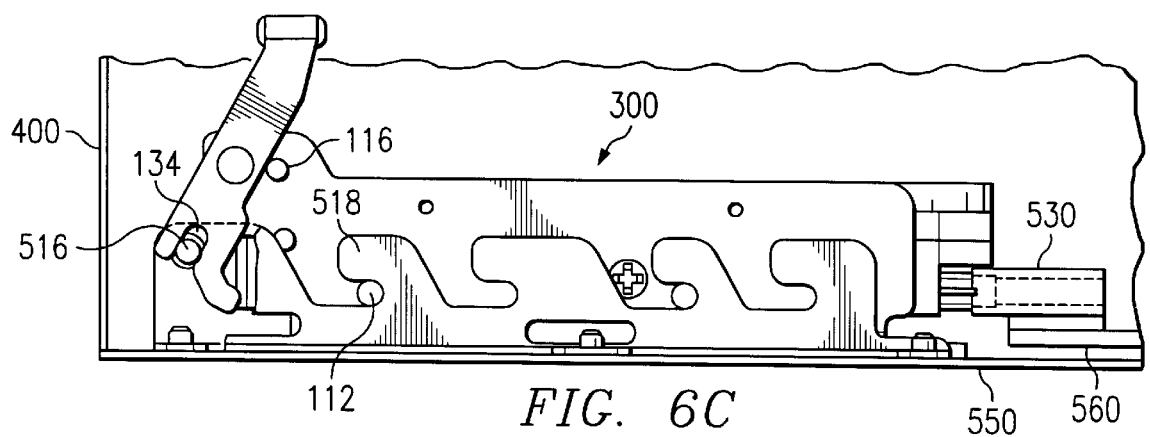
FIG. 6C depicts a cross-sectional view of the exemplary disk drive unit in yet another position with respect to the exemplary chassis in which the disk drive unit is disposed.

FIG. 6C depicts a cross-sectional view of chassis 400 when connector 330 reaches the position for effecting mating between connector 330 and connector 530. In the illustrated embodiment, connector 330 is fully mated with connector 530. Thus, as can be seen in FIGS. 6A, 6B, and 6C, disk drive unit 300 may be situated within chassis 400 along a plane orthogonal to the plane along which connector 330 mates with connector 530.

In one embodiment, stop 116 prevents lever member 124 from further rotating in the clockwise direction thereby potentially damaging connectors 330 and 530. In addition or in the alternative, in some embodiments, stops of drive guide 500 (e.g., stops 518 and 520 (not shown)) engage appendages of drive bracket 102 (e.g., appendage 112) thereby prohibiting further movement of removable disk drive unit 300 towards connector (such further movement may also damage connectors 330 and 530).

Figure 7:
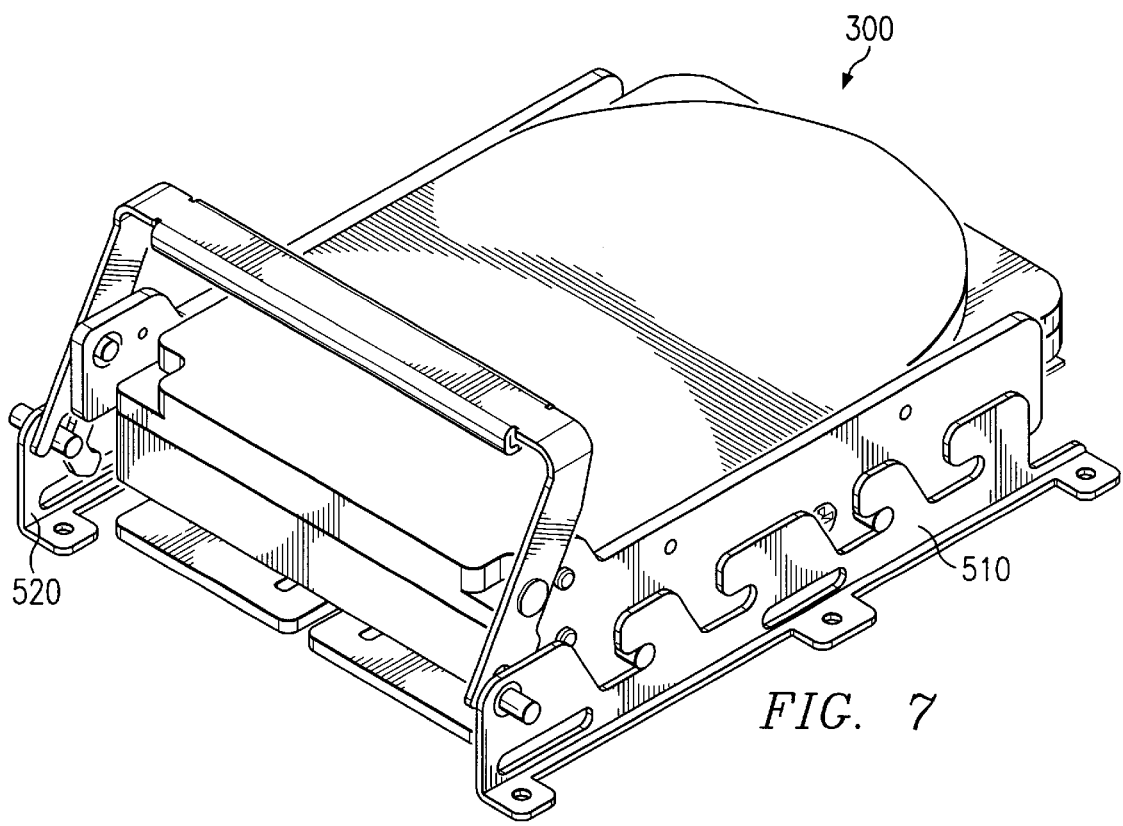
FIG. 7 depicts an engagement of an exemplary disk drive unit and an exemplary drive guide according to an embodiment of the present invention.

FIG. 7 provides a perspective view of an exemplary arrangement of disk drive unit 300 and drive guide 500 when disk drive unit has been moved to the position depicted in FIG. 6C. Similarly, FIG. 8 depicts an exemplary arrangement of disk drive unit 300 within chassis 400 when disk drive unit 300 has been moved to the position depicted in FIG. 6C.

In order to move removable disk drive unit 300 into a position for effecting an unmating of connector 330 and connector 530 (e.g., the position depicted in FIG. 6A), lever member 124 is moved in a reverse orientation from that used to mate connector 330 and 530. In the illustrated embodiments of FIGS. 6A–6C, this direction is counter-clockwise. Movement of lever member 124 about protrusion 516 and 518 tends to urge removable disk drive unit 300 away from connector 530. Thus, movement of lever member 124, moves unit 300 with respect to chassis 400. In one embodiment, such movement is along rails 510 and 520. In some embodiments, eventually, stop 114 prevents further movement of lever member 124 in the reverse orientation. At this point, removable disk drive unit may be removed from chassis 400 along the plane along which unit 300 was situated within chassis 400.

A flow diagram depicting exemplary steps of a method for situating a disk drive within a chassis according to an embodiment of the present invention is depicted in FIG. 9. In the illustrated embodiment, disk drive unit 300 is formed by coupling disk drive 310 to drive bracket 102, drive bracket 102 having lever member 124 movably coupled thereto (box 901). In some embodiments, disk drive unit 300 is then situated within chassis 400) so as to engage lever member 124 with drive guide 500, which is coupled to chassis 400 (box 902). This situating of disk drive unit 300 within said chassis occurs along a plane other than a plane along which disk drive connector 330 mates with connector 530. Furthermore, this other plane may be orthogonal to the plane along which disk drive connector 330 mates with the connector 530.

In some embodiments, such situating comprises forming a mating/unmating mechanism (box 903). This mating/unmating mechanism may be responsive to movement of lever member 124 to one position for effecting a mating between connector 330 and connector 530, and responsive to movement of lever member 124 to another position for effecting an unmating of connector 330 and connector 530. In some embodiments, such forming of the mating/umating mechanism comprises forming a camming arrangement comprising at least one protrusion of drive guide 500 (e.g., protrusions 516 and 526) and at least one camming slot formed by lever member 124 (e.g., camming slots 134 and 136) arranged such that when the at least one protrusion is engaged with the at least one camming slot and the lever member is moved, disk drive 310 is moved with respect to chassis 400 (box 904). Moreover, in the illustrated embodiment, such forming of said mating/unmating mechanism comprises influencing by at least one surface of lever member 124 (e.g., surfaces 138 and 140) of the at least one camming slot towards the at least one protrusion (box 905). Furthermore, in one embodiment, at least one stop protruding from drive bracket 102 (e.g., stops 114 and 116) limit the range of motion of lever member 124 (box 906).

In one embodiment, disk drive unit 300 is removed from chassis 400 along the above-discussed plane other than the plane along which connector 330 mates with connector 530. (box 907). Such removal may occur in the manner discussed above.

It will be appreciated by one of ordinary skill in the art that the steps, as well as the order of the steps, shown in FIG. 9 and discussed above, are by way of example only. More, fewer, and/or different steps than those shown in FIG. 9 may be included the above-discussed method. Moreover, the steps may be performed in an order other than that depicted in FIG. 9.

Therefore, as can be seen, in one embodiment, unlike existing removable disk drive units, removable disk drive unit 300 may be situated within a chassis along a plane other than a plane along which a connector of disk drive unit 300 is to be mated with a connector disposed within a chassis. Moreover, in one embodiment, removable disk drive unit 300 may be situated within a chassis in such a manner and still enable mating and unmating of the connectors.

In addition, in some embodiments, removable disk drive unit 300 allows for the application of mating and unmating forces uniformly across the width of the connectors. For example, since, in one embodiment, lever member 124 spans the width of removable disk drive unit 300, mating and/or unmating force applied by a user may be substantially uniformly distributed across the mating or unmating connectors.

What is claimed is:
1. A system for situating a disk drive within a chassis, said system comprising:
   a disk drive unit comprising a drive bracket coupled to said disk drive, as well as a lever member movably coupled to said drive bracket; and
   a drive guide coupled to said chassis,
   wherein said lever member is operable to engage said drive guide when said disk drive unit is being situated within said chassis; and wherein said system enables the situating of said disk drive unit within said chassis along a plane other than a plane along which a connector of said disk drive mates with a connector disposed within said chassis.

2. The system of claim 1 wherein the engagement of said lever member with said drive guide forms a mechanism responsive to movement of said lever member to one position for effecting said mating between the disk drive connector and the connector disposed within said chassis, and responsive to movement of said lever member to another position for effecting an unmating of the disk drive connector and the connector disposed within said chassis.

3. The system of claim 1 wherein said drive guide is operable to align said disk drive unit with said connector disposed within said chassis.

4. The system of claim 1 wherein said drive bracket comprises at least one stop operable to limit a range of motion of said lever member.

5. The system of claim 1 wherein said lever member is generally U-shaped with side arms movably coupled to respective opposing sides of said drive bracket.

6. The system of claim 1 wherein said lever member enables application of force across the width of said drive bracket.

7. The system of claim 1 wherein said lever member comprises an open hem design operable to provide ease of handling for said disk drive unit.

8. The system of claim 1 wherein said drive guide comprises a plurality rails.

9. They system of claim 1 wherein said drive bracket comprises a generally U-shaped housing in which said disk drive is received.

10. The system of claim 1 wherein said drive bracket comprises drive bracket slots operable to engage tabs extending from a base of said chassis.

11. The system of claim 1 wherein said drive bracket comprises a deformable base.

12. The system of claim 1 wherein said other plane is orthogonal to said plane along which the disk drive connector mates with the connector disposed within the chassis.

13. The system of claim 2 wherein said lever member is further operable to disengage said drive guide when said lever member is situated at said another position; and
wherein said system enables the removal of said disk drive from said chassis along said plane other than said plane along which the disk drive connector mates with the connector disposed within the chassis.

14. The system of claim 2 wherein said mechanism comprises a camming arrangement comprising at least one protrusion of said drive guide and at least one camming slot formed by said lever member arranged such that when said at least one protrusion is engaged with said at least one camming slot and said lever member is moved, said disk drive is moved with respect to said chassis.

15. The system of claim 2 wherein said drive guide forms at least one slotted opening and said drive bracket comprises at least one appendage; and
wherein said at least one appendage is operable to engage said at least one slotted opening when said lever member engages said drive guide.

16. The system of claim 2 wherein said drive bracket comprises at least one appendage and said drive guide comprises at least one stop such that when said lever member is moved towards said one position for effecting said mating of the disk drive connector and the connector disposed within said chassis, said at least one appendage of said drive guide engages said at least one stop of said drive guide.

17. The system of claim 3 wherein said drive guide is operable to vertically and horizontally align the disk drive connector with the connector disposed within said chassis.

18. The system of claim 8 wherein said rails are interchangeable.

19. The system of claim 14 wherein said lever member comprises at least one surface operable to influence said at least one camming slot towards said at least one protrusion during formation of said mechanism.

20. A method for situating a disk drive within a chassis, said method comprising:
forming a disk drive unit by coupling a disk drive to a drive bracket having a lever member movably coupled thereto; and
situating said disk drive unit within said chassis so as to engage said lever member with a drive guide coupled to said chassis, wherein the situating of said disk drive unit within said chassis occurs along a plane other than a plane along which a connector of said disk drive mates with a connector disposed within said chassis.

21. The method of claim 20 wherein said situating comprises
forming a mating/unmating mechanism, said mating/unmating mechanism being responsive to movement of said lever member to one position for effecting a mating between the disk drive connector and the connector disposed within said chassis, and responsive to movement of said lever member to another position for effecting an unmating of the disk drive connector and the connector disposed within said chassis.

22. The method of claim 20 further comprising limiting the range of motion of said lever member by at least one stop protruding from said drive bracket.

23. The method of claim 20 wherein the other plane of said situating of said disk drive unit is orthogonal to the plane along which the disk drive connector mates with the connector disposed within said chassis.

24. The method of claim 21 further comprising
removing said disk drive unit from said chassis along said plane other than the plane along which the disk drive connector mates with the connector disposed within said chassis.

25. The method of claim 21 wherein said forming of said mating/umating mechanism comprises forming a camming arrangement comprising at least one protrusion of said drive guide and at least one camming slot formed by said lever member arranged such that when said at least one protrusion is engaged with said at least one camming slot and said lever member is moved, said disk drive is moved with respect to said chassis.

26. The method of claim 25 wherein said forming of said mating/unmating mechanism comprises influencing by at least one surface of said lever member of said at least one camming slot towards said at least one protrusion.

27. A system for situating a disk drive within a chassis, said system comprising:
means for receiving said disk drive, said disk drive being coupled to said receiving means; and
means for guiding said disk drive towards and away from a connector disposed within said chassis, said guiding means being coupled to said chassis;
wherein the guiding means and the receiving means are operable to engage as said disk drive is being situated within said chassis; and
wherein said system enables the situating of said disk drive unit within and removal of said disk drive unit from said chassis along a plane other than a plane along which a connector of said disk drive mates within a connector disposed within said chassis.

28. The system of claim 27 wherein, when engaged, the guiding means and the receiving means form a means for mating/unmating of said disk drive, the mating/unmating means being responsive to movement of a lever member of said receiving means to one position for effecting a mating between the disk drive connector and the connector disposed within said chassis, and responsive to movement of said lever member to another position for effecting an unmating of the disk drive connector and the connector disposed within said chassis.

29. The system of claim 27 wherein the receiving means comprises a means for providing ease of handling for said receiving means.

30. The system of claim 27 wherein the other plane is orthogonal to the plane along which the disk drive connector mates with the connector disposed within the chassis.

31. The system of claim 28 wherein the mating/unmating means comprises a camming means such that when the receiving means is engaged with the alignment means and the lever member is moved, said disk drive is moved with respect to said chassis.

32. The system of claim 31 wherein the receiving means comprises a means for influencing at least one camming slot of the camming means towards at least one protrusion of the alignment means during formation of the mating/unmating means.

33. A disk drive system comprising:

a removable disk drive unit comprising a disk drive coupled to a disk bracket and a lever member movably coupled to said drive bracket, said disk drive comprising a connector; and a chassis operable to receive said removable disk drive unit, said chassis comprising a drive guide, as well as a connector mateable with the removable disk drive unit connector, disposed therein;

wherein at least one camming slot of said lever member is operable to engage at least one protrusion of said drive guide such that when said lever member is moved to a first position, said removable disk drive unit is urged towards the connector mounted within the chassis, and when said rotating lever member is moved to another position, said removable disk drive unit is urged away from the connector mounted within the chassis; and wherein said system enables the situating of said removable disk drive unit within and removal of said removable disk drive unit from said chassis along a plane orthogonal to a plane along which the removable disk drive unit is urged towards or away from said corresponding connector.

* * * * *